United States Patent [19]

Samela et al.

[11] Patent Number: 5,313,105

[45] Date of Patent: May 17, 1994

[54] SIGNAL LINE INCREASED CURRENT KICKER TERMINATOR APPARATUS

[76] Inventors: Francis M. Samela, 316 W. Goebel Dr., Lombard, Ill. 60148; William L. Zuckerman, 8942 Crawford, Skokie, Ill. 60076

[21] Appl. No.: 883,303

[22] Filed: May 14, 1992

[51] Int. Cl.⁵ .............................. H03H 11/28
[52] U.S. Cl. ..................... 307/99; 307/125; 307/264; 333/124
[58] Field of Search .......... 307/98, 99, 103, 125, 307/130, 490, 262, 264, 270; 333/124; 379/394, 398, 340; 370/32.1

[56] References Cited

U.S. PATENT DOCUMENTS

| | | | |
|---|---|---|---|
| 4,748,426 | 5/1988 | Stewart | 333/124 |
| 5,089,724 | 2/1992 | Chuang et al. | 307/246 |
| 5,198,699 | 3/1993 | Hashimoto et al. | 307/270 |
| 5,254,878 | 10/1993 | Olsen | 307/77 |

Primary Examiner—A. D. Pellinen
Assistant Examiner—Richard Elms
Attorney, Agent, or Firm—Hill, Steadman & Simpson

[57] ABSTRACT

A terminator apparatus used with a SCSI bus line controls the voltage level of a notch occurring in data and/or control signals transferred on the bus line. The terminator apparatus includes a termination network, a current switching device, and a programmed monitoring circuit. The termination network generates a first current. The current switching device generates a second current. The monitoring circuit controls a programmed length of time that the second current is generated. The current switching device is responsive to the monitoring circuit for disconnecting the second current when the programmed length of time has been exceeded. The second current serves to raise the voltage level of the notch occurring in the signal lines when they are deasserted so as to prevent erroneous data from being transferred.

20 Claims, 4 Drawing Sheets

SIGNAL LINE INCREASED CURRENT KICKER TERMINATOR APPARATUS

BACKGROUND OF THE INVENTION

This invention relates generally to terminator devices and more particularly, it relates to an improved terminator apparatus used with a SCSI (acronym for small computer system interface) bus line for controlling the voltage level of a notch occurring in data and/or control signals transferred on the bus line so as to prevent erroneous data from being transferred.

One application where reliable data transfer becomes important is in the field of data transmission on a fully loaded SCSI bus line for communication between a plurality of data transceivers and a central processing unit (CPU) in a small computer. Typically, control signals REQ and ACK on respective request and acknowledge signal lines are used to perform a "handshake" so as to transfer the data back and forth between a target (i.e., a disk drive) and an initiator (i.e., a host computer). Each of the control signals REQ and ACK is essentially a plurality of pulses having either a high logic value or a low logic value. When the control signal REQ or ACK is asserted, it is at the low logic value. When the control signal REQ or ACK is deasserted, it is at the high logic value.

In operation, when the control signal REQ on the request line makes the transition from the asserted condition to the deasserted condition (i.e., low-to-high transition), there exists a condition on the SCSI bus line which can cause the corruption of data. At the rising edge of the control signal REQ, there will appear what is referred to as a "notch." This notch is typically accompanied by a reflection caused by stub drive cabling. The combined effect of the notch and the stub reflection will cause the rising edge of the control signal REQ to reverse its direction and "double back" before reaching the deassertion level (i.e., +2.0 volts). If this reversing control signal REQ falls below the +1.5 volt level, it may result in a "double trigger" and be interpreted as a valid request signal (i.e., another assertion), thereby causing erroneous data to be transferred.

As is generally well known in the art of computer equipment manufacturing, a termination device is typically connected to each end of an OR-WIRED SCSI bus line for supplying a fixed supply voltage with a predetermined impedance. In FIG. 1, there is shown prior art termination networks 10 and 12 connected to the respective ends of the OR-WIRED SCSI bus line 14. The termination network 10 or 12 of FIG. 1 is sometimes referred to as a "220/330 terminator." Each of the termination networks 10, 12 includes a voltage divider formed of two resistors T1 and T2 connected in series. One end of the resistor T1 is connected to an input power supply voltage TERMPWR, which is typically at +4.75 volts. One end of the resistor T2 is connected to a ground potential GND, which is typically at zero volts. The junction of the resistors T1 and T2 for the termination network 10 is connected to one end of the bus line 14, and the junction of the resistors T1 and T2 for the termination network 12 is connected to the other end of the bus line. For the SCSI bus line, the value of the resistors T1 and T2 are shown to be 220Ω and 330Ω respectively so as to provide approximately +2.85 volts at the junction points J1 and J2 when the bus line is not active.

The OR-WIRED SCSI bus line 14 has a plurality of transceivers 16a, 16b, and 16c which are connected thereto by respective signal lines 18a, 18b, and 18c. Each of the transceivers 16a-16c includes a controller driver 20 having an open collector output (i.e., NAND logic gate type 7438) and a receiving device 22 (i.e., Schmitt trigger input type 7414). When the controller driver 20 is turned off, the signal line (i.e., line 18a) is at a high or logic "1" level which has a voltage value of approximately +2.85 volts. When the controller driver 20 is turned on, the signal line is at a low or logic "0" level since the open collector output device will pull the voltage value on the signal line down to approximately zero volts (i.e., 0.2 volts through the driver transistor Q1). For example, the signal line 18a may be used for the control signal REQ, and the signal line 18b may be used for the control signal ACK.

In FIG. 2, there is shown another prior art termination network 10a. This alternative arrangement of FIG. 2 is sometimes referred to as a "110 regulated terminator." The termination network 10a includes a voltage regulator 24 for receiving the voltage TERMPWR on line Vin and for generating a regulated voltage on line Vout of approximately +2.85 volts with 110 ohms resistors to the respective 18 signal lines DB(0)-DB(7), DB(P), ATN, BSY, ACK, RST, MSG, SEL, C/D, REQ and I/O.

The principal unsolved problem of the prior art termination networks 10 or 10a was that neither one had the capability of raising the notch above the critical "double trigger" area (between +1.5 volts and +2.0 volts). As can be seen from the curve A of FIG. 5, the signal line in the 220/330 terminator has a notch N1 occurring at approximately +1.0 volts. Similarly, there is shown in the curve B of FIG. 5 that the signal line in the 110 regulated terminator has a notch N2 occurring at approximately +1.4 volts. Thus, these prior art termination networks did not teach how the notch could be raised above the critical area.

Further, it is also generally known that the voltage level of the notch is determined by the cable impedance and the amount of current present in the bus line 14a when it is released or deasserted by the respective controller driver 20. While the SCSI specification defines cable impedance to be "no less than 90 ohms," twisted pair or "round cable" impedance is seldom found to be greater than 90 ohms and may be as low as 45 ohms.

Even though these controller drivers 20 have the capability of sinking more current, a problem occurs referred to as "metal migration" when sinking high current over prolonged periods of time. This situation arises when the request control signal (REQ) is asserted, (low logic level) and the system fails to respond with the associated acknowledge control signal (ACK). In other words, the control signal REQ is being constantly asserted and does not deassert itself. Thus, this will cause the system to "hang" until the error is cleared up by deasserting the control signal REQ. If the unattended system hangs over an extended holiday weekend, this situation could last for many days without being corrected.

There is also known in the prior art of a terminator design which utilizes a diode clamping technique for raising the level of the notch by providing current in excess of the 24 mA. However, this prior art technique suffers from the disadvantage that this extra current is uncontrolled and may vary between 24 mA to 45 mA. Further, this extra current will be provided to the controller driver indefinitely when the system "hangs" and thus may result in the destruction of the costly controller driver.

Accordingly, there has arisen a need in the computer equipment industry for an improved terminator apparatus for raising the level of the notch occurring in the data and/or control signals on the SCSI bus line so as to provide reliable and accurate data transmission. Further, it would be expedient that the terminator apparatus be capable of being incorporated internally into conventional termination networks or can be connected externally to existing systems having conventional termination networks.

SUMMARY OF THE INVENTION

Accordingly, it is a general object of the present invention to provide an improved terminator apparatus for controlling the voltage level of a notch occurring in data and/or control signals which is relatively simple and economical to manufacture and assemble.

It is an object of the present invention to provide an improved terminator apparatus for raising the voltage level of a notch occurring in the control and/or data signals on the SCSI bus line so as to provide reliable and accurate data transmission.

It is another object of the present invention to provide an improved terminator apparatus which includes a termination network, a current switching device, and a programmed monitoring circuit.

It is still another object of the present invention to provide a terminator method used with a SCSI bus line for controlling the voltage level of a notch occurring in data and/or control signals transferred on the bus line.

In accordance with these aims and objectives, the present invention is concerned with the provision of a terminator apparatus used with a SCSI bus line for controlling the voltage level of a notch occurring in data and/or control signals transferred on the bus line. The terminator apparatus includes a termination network, a current switching device, and a programmed monitoring circuit. The termination network is interconnected between an input termination power supply voltage and a plurality of data and/or control signal lines coupled to the bus line for generating a first current. The current switching device is interconnected between the power supply voltage and at least one of the plurality of data and/or control signal lines for generating a second current.

The programmed monitoring circuit is interconnected between the current switching device and the at least one of the plurality of data and/or control signals for controlling a programmed length of time that the second current is generated. The current switching device is responsive to the monitoring circuit for disconnecting the second current when the programmed length of time has been exceeded. The second current serves to raise the voltage level of the notch occurring in the at least one of the plurality of data and/or control signal lines when it is deasserted so as to prevent erroneous data from being transferred.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

It is to be distinctly understood at the outset that the present invention shown in association with a SCSI bus line is not intended to serve as a limitation upon the scope or teaching thereof, but is merely for the purpose of convenience of illustration of one example of its application. The present invention has numerous applications in other fields and apparatus since the invention pertains to a terminator apparatus for controlling the voltage level of a notch occurring in data and/or control signals.

Figure 1:
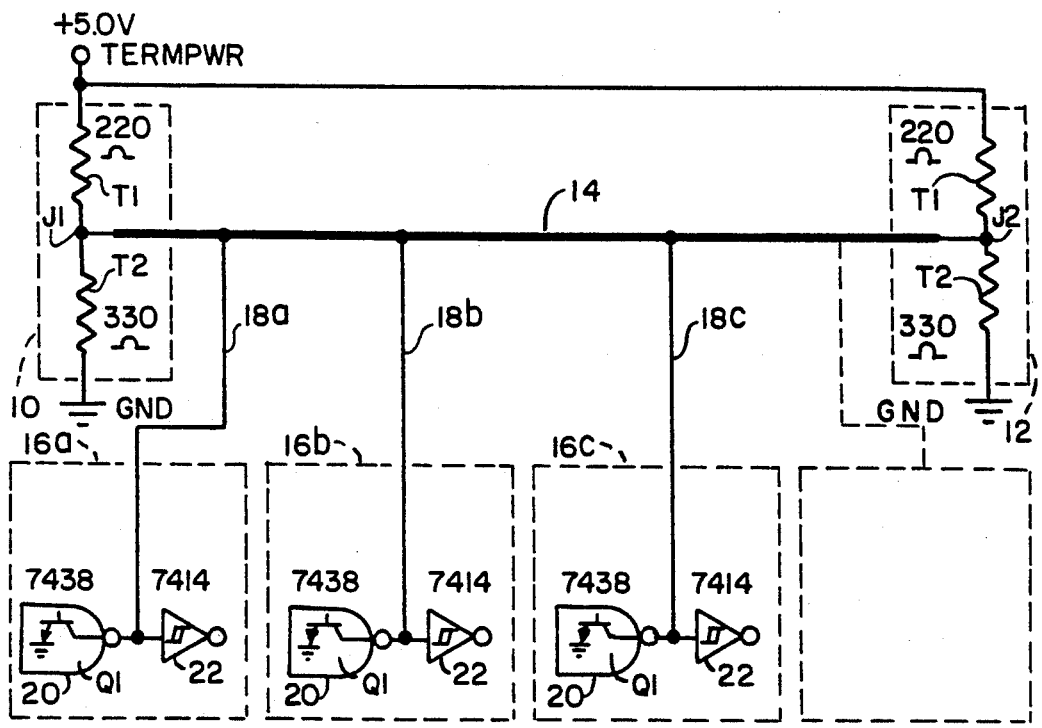
FIG. 1 illustrates prior art termination networks interconnected to the respective ends of an OR-WIRED SCSI bus line.
Figure 3:
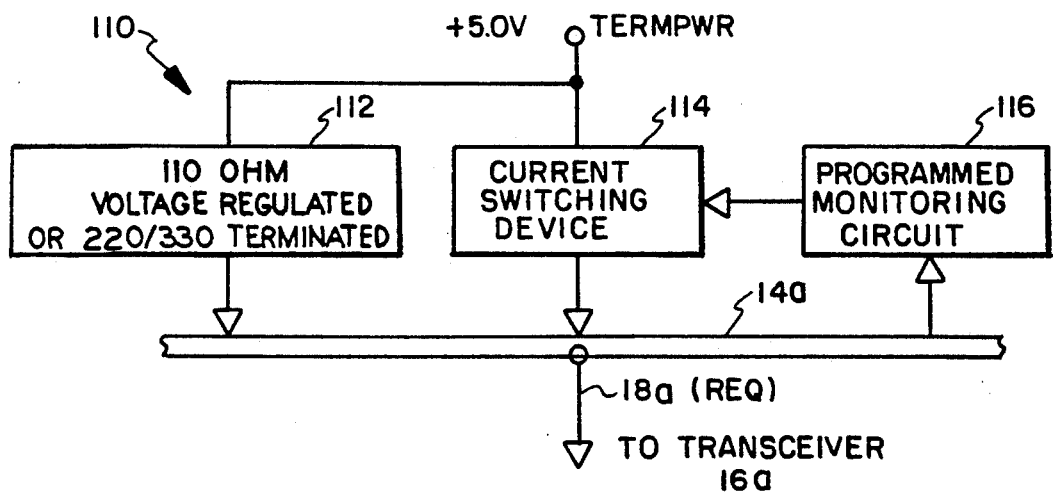
FIG. 3 is a block diagram of an improved terminator apparatus, constructed in accordance with the principles of the present invention.

Referring now in detail to the drawings, there is shown in FIG. 3 a block diagram of an improved signal line increased current kicker (SLICK) terminator apparatus 110 which is constructed in accordance with the principles of the present invention. The terminator apparatus 110 is adapted to be used with or is connected to ends of a SCSI bus line 14a (similar to the bus line 14 in FIG. 1) for raising the voltage level of a notch occurring in data and/or control signals transferred on the bus line. For example, the transceiver 16a of FIG. 1 can be connected to the bus line 14a in FIG. 3 via the signal line 8a designated as a request signal line for a control signal REQ. The terminator apparatus 110 is comprised of a conventional termination network 112 (such as termination network 10 of FIG. 1), a current switching device 114, and a programmed monitoring circuit 116.

Figure 4:
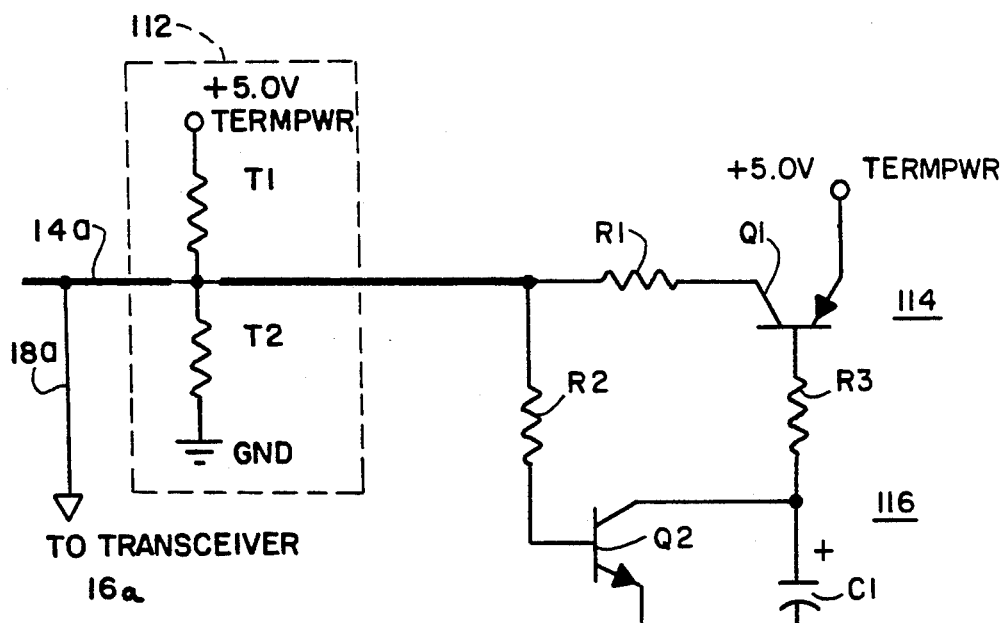
FIG. 4 is a detailed schematic circuit diagram of an embodiment of the terminator apparatus of FIG. 3.

In FIG. 4, there is shown a detailed schematic circuit diagram of the SLICK terminator apparatus 110 of FIG. 3. For ease of illustration and discussion, the conventional termination network 112 is comprised of a 220/330 termination network similar to the termination network 10 or 12 of FIG. 1. Thus, the 220/330 terminator (112) includes a voltage divider formed of two resistors Ti and T2 connected in series. One end of the resistor T1 is connected to an input termination power supply voltage TERMPWR, which is typically at +4.75 volts. One end of the resistor T2 is connected to a ground potential GND, which is typically at zero volts. The junction of the resistors T1 and T2 for the termination network 112 is connected to one end of the bus line 14a.

The current switching device 114 includes a bipolar transistor Q1 of the PNP-type conductivity and a current-limiting resistor R1. The transistor Q1 has its emitter connected also to the power supply voltage TERMPWR and its collector connected to one end of the resistor R1. The other end of the resistor R1 is connected to the bus line 14a.

The programmed monitoring circuit 116 consists of resistors R2 and R3, a bipolar transistor Q2 of the NPN-type conductivity, and a capacitor C1. The transistor Q2 has its base connected to one end of the resistor R2, its collector connected to one end of the capacitor C1 and to one end of the resistor R3, and its emitter connected to the ground potential. The other end of the resistor R2 is connected to the bus line 14a, and the other end of the capacitor C1 is connected to the ground potential. The other end of the resistor R3 is connected to the base of the transistor Q1.

It should be clearly understood to those skilled in the art that additional current switching devices and programmed monitoring circuits similar to 114 and 116 could be connected to each of the other remaining signal lines so as to raise the voltage level of the notch appearing therein. However, in order to reduce cost, the current switching device and the programmed monitoring circuit are generally implemented only with the signal line which is highly sensitive to the notch. In other words, at least the control signal line (REQ) being the most critical to reliable and accurate data transfer has been implemented with such circuits.

Figure 2:
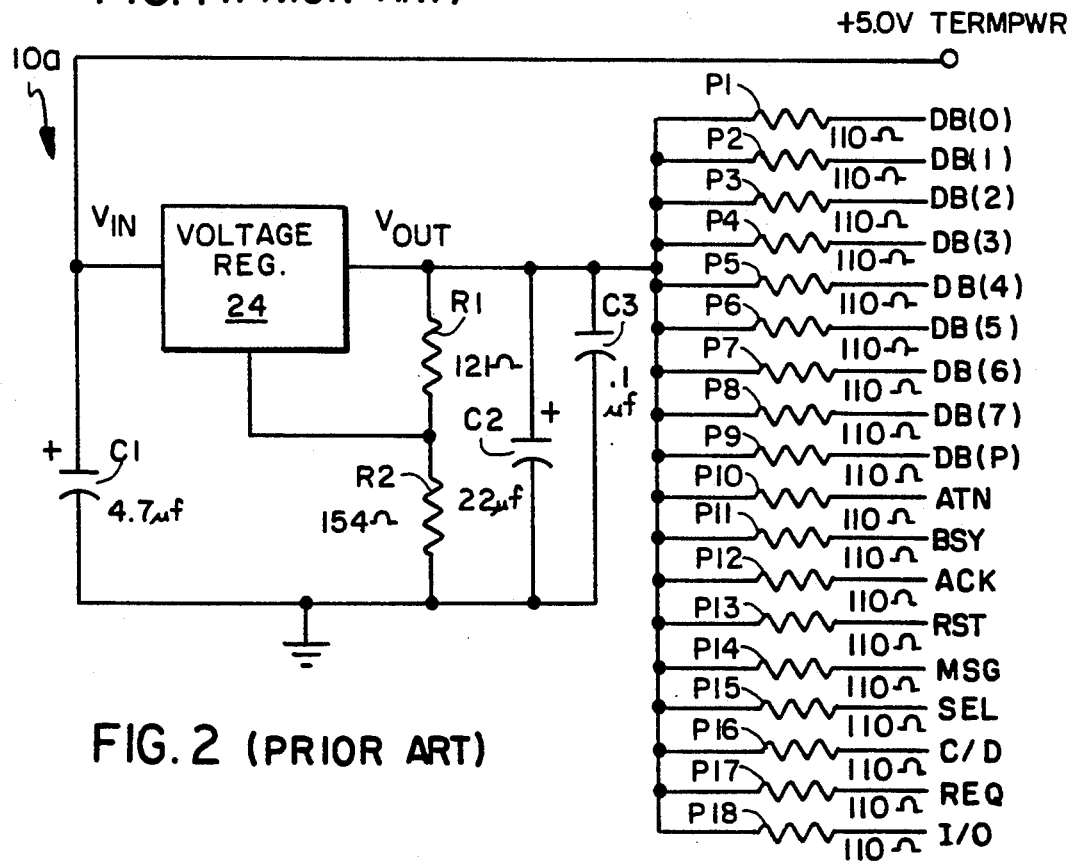
FIG. 2 shows another prior art termination network.
Figure 5:
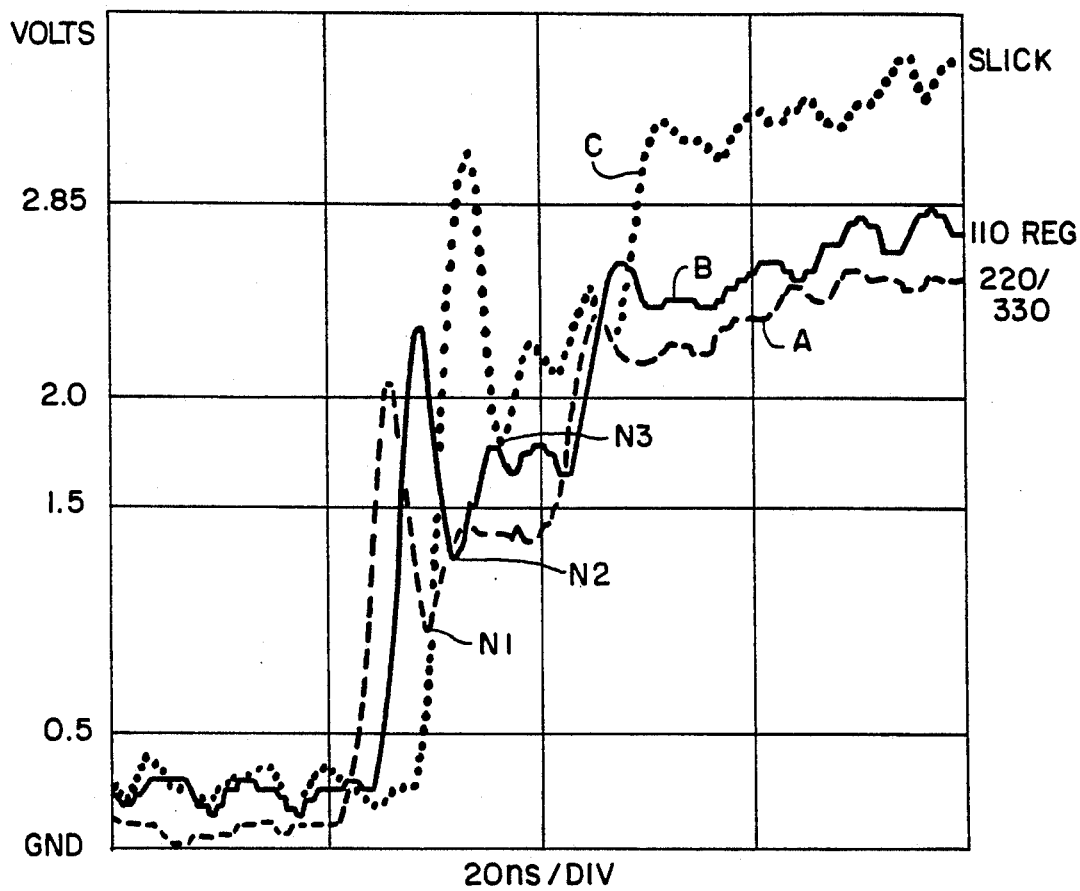
FIG. 5 shows waveforms appearing on respective signal lines, useful in understanding the operation of the present invention.

The operation of the present SLICK terminator apparatus 110 of FIG. 4 will now be explained with reference to the graphs of FIGS. 5, 6 and 7. In particular, the curve A of FIG. 5 illustrates the voltage level of the control signal REQ on the request signal line in the prior art 220/330 terminator of FIG. 1. As can be seen, when the control signal REQ is switched from the asserted condition (low or logic "0" level) to the deassertion condition (high or logic "1" level), a notch N1 occurs at approximately +1.0 volts. Similarly, the curve B of FIG. 5 depicts the control signal REQ on the request signal line in the prior art 110 regulated terminator of FIG. 2. As can be seen, when the control signal REQ is switched from the asserted condition to the deasserted condition, the notch N2 occurs at approximately +1.4 volts. Therefore, the notches N1 and N2 could be interpreted by a receiving device coupled to the SCSI bus line 14a as a valid request signal. As a result, such notches may cause incorrect data to be transferred.

The improved terminator apparatus 110 of FIG. 4 of the present invention will control or raise the voltage level of the notch appearing in the control signal REQ so as to produce the curve C of FIG. 5. When the control signal REQ makes the transition from the asserted condition to the deasserted condition, the notch N3 in the curve C will be raised above the "double trigger" area and now appears at approximately +1.8 volts.

Referring now again to FIG. 4, when the control signal REQ is deasserted (high logic level) the transistor Q2 of the monitoring circuit 116/114 will be turned on due to the base drive current via the resistor R2. Any residual voltage which may be present on the capacitor C1 will be discharged through the transistor Q2 to ground. Additionally, the base of the transistor Q1 will also be placed at ground potential via the resistor R3. As a result, the transistor Q1 will be rendered conductive. Consequently, the resistor R1 will then be connected to the power supply voltage TERMPWR via the transistor Q1. This stable condition causes the power supply voltage to be connected to the request signal line 14a via the resistor R1.

When the control signal REQ on the line 18a is asserted (low logic level), the resistor R1 will provide instantaneously a second current path from the power supply voltage TERMPWR through the signal line 14a. This current flowing through the resistor R1 is in addition to that which is provided by the first current path via the resistor T1 in the termination network 112. Since the transistor Q1 is already turned on prior to the time of assertion, there will be no transients created on the request signal line 18a upon assertion. The amount of this additional current can be selected by controlling the value of the resistor R1 and may be set to a predetermined value consistent with cable impedance requirements.

The monitoring circuit 116 will now measure the length of time that the request signal line is being asserted. Further, if the period of assertion is longer than the programmed length of time, the additional current furnished by the second current path will be cancelled. Therefore, the current supplied to the controller driver in the transceiver 16a via the signal line 18a will be limited to the current supplied by the termination network 112.

In particular, during the period of assertion, the transistor Q2 will be turned off. As a consequence, the capacitor C1 will begin to charge up towards the power supply voltage TERMPWR through the resistor R3 and the emitter-base junction of the transistor Q1. If the request signal line 18a remains asserted, such as in the case of a "hung" system, the capacitor C1 will be charged to a point where the transistor Q1 will no longer be conductive. This condition occurs when the emitter-base voltage is less than approximately +0.7 volts.

For typical SCSI voltage, this time period is approximately two time constants (i.e., $Tc=R3\times C1$). At the end of this "timeout" period, the transistor Q1 will be turned off. Therefore, the current added to the request signal line 18a by the second current path via the resistor R1 will be cancelled, and only the current from the termination network 2 will be provided.

Figure 8:
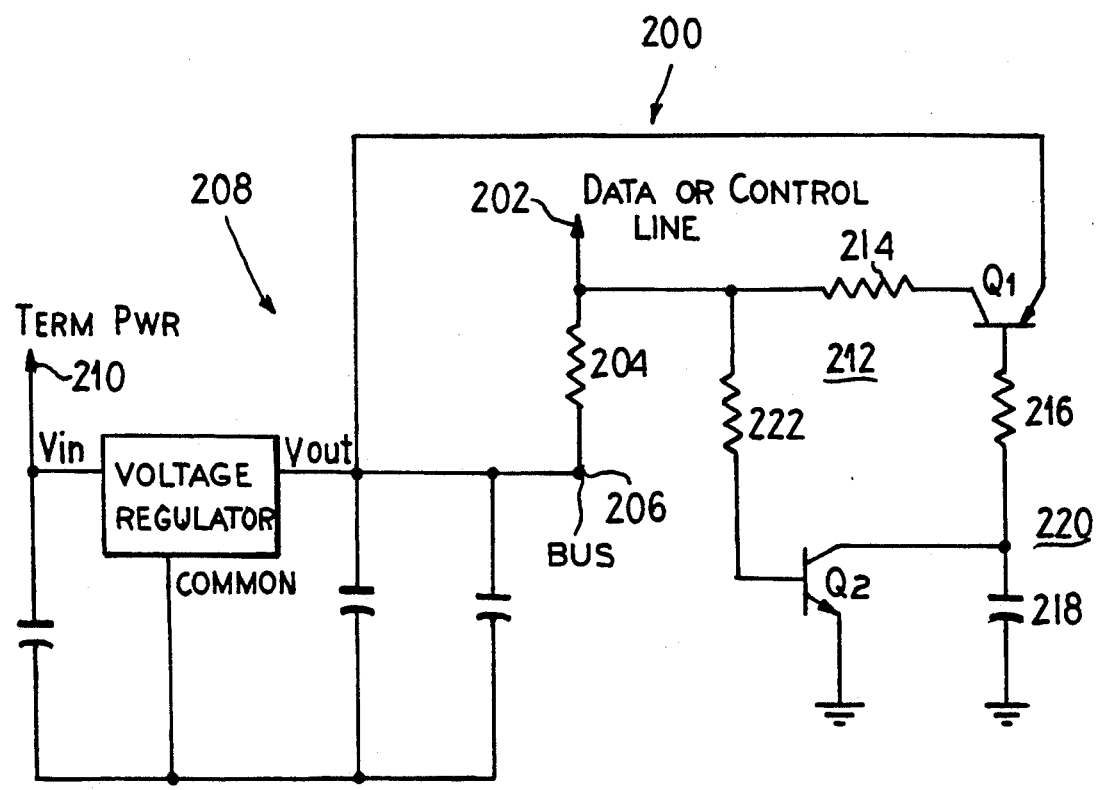
FIG. 8 is a circuit diagram of another embodiment of the terminator apparatus of FIG. 3.

FIG. 8 illustrates another embodiment 200 of the terminator apparatus of FIG. 3 wherein the terminator network comprises a 110 ohm voltage regulated terminator. As illustrated, a data or control line 202, e.g. a REQ or ACK signal line, is coupled to a bus 206 via a 110 ohm resistor 204. A suitable voltage regulator arrangement 208 is coupled between terminal power (TERMPWR) 210 and the bus 206.

As also illustrated, a PNP transistor Q1 of a current switch 212 is coupled to line 202 via resistor 214. The base of the transistor Q1 is coupled to ground via serially connected resistor 216 and capacitor 218. The base of an NPN transistor Q2 is coupled to line 202 via a resistor 222 while the collector of transistor Q2 is connected between the resistor 216 and the capacitor 218.

In a manner similar to the arrangement set forth in FIG. 4, when the signal line 202 is deasserted (high logic level), the transistor Q2 of the monitoring circuit 220 will be turned on due to the base drive current via the resistor 222. Any residual voltage on the capacitor 218 will then be discharged to ground via the transistor Q2. Additionally, the base of the transistor Q1 will also be placed at ground potential via the resistor 216. As a result, the transistor Q1 will be rendered conductive. Consequently the resistor 214 will then be connected to the regulated power supply output Vout via the transistor Q1. This stable condition causes the power supply voltage Vout to be connected to the signal line 202 via the resistor 214. Transistor Q1 and Q2 and the monitor circuit 220 then function as set forth above in connection with FIG. 4.

Figure 6:
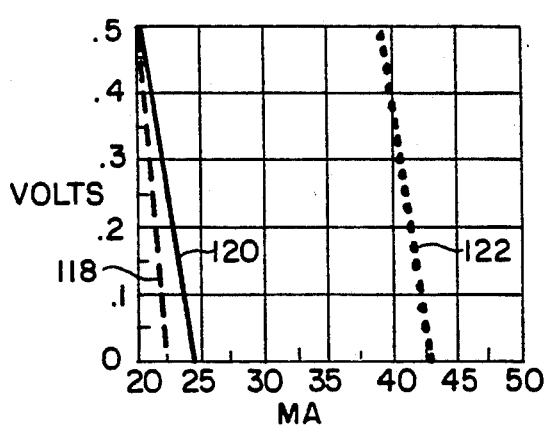
FIG. 6 shows curves, illustrating currents appearing in the respective signal lines.

In FIG. 6, curve 118 shows the amount of current flowing in the signal line of the prior art termination network 10 when it is pulled down below the minimum assertion level of +0.5 volts and all the way down to zero volts. Similarly, curve 120 shows the amount of current flowing in the signal line of the prior art termination network 10a when it is pulled down between +0.5 volts and zero volts. However, it will be noted that there is no appreciable amount of increased current, and thus the respective notches N1 and N2 in FIG. 5 will be created. On the other hand, curve 122 shows the amount of current flowing in the signal line of the present terminator apparatus 110 when it is pulled down between +0.5 volts and zero volts. It can be seen that the current is increased in a highly controlled manner so as to raise the notch N3 (FIG. 5) and its associated stub reflection well above the critical "double trigger" area.

Figure 7:
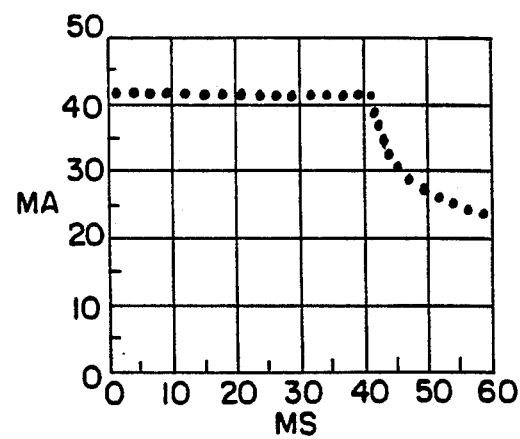
FIG. 7 is a curve of the current as a function of time appearing on the signal line in the terminator apparatus of the present invention.

In FIG. 7, there is shown the amount of current flowing in the signal line of the present terminator apparatus 110 as a function of time. As noted, when the programmed length of time is exceeded (i.e., 40 ms), the current will be slowly changed from approximately 41 mA to 24 mA. This gradual change is controlled by the capacitor C1 and the transistor Q1 and thus again avoids the generation of transients.

In the typical situation, the control signal REQ will be deasserted (high logic level) before the expiration of this programmed length of time. When this deassertion occurs, the transistor Q2 will be turned on again so as to discharge the capacitor C1. As a result, the terminator apparatus 110 is reset to its original condition, and a new cycle is repeated. It should be understood that the terminator apparatus is always reset when the request signal line is deasserted. In other words, whenever the error is cleared after the system is "hung" the terminator apparatus is returned automatically to its original condition.

From the foregoing detailed description, it can thus be seen that the present invention provides an improved terminator apparatus used with a SCSI bus line for controlling the voltage level of a notch occurring in data and/or control signals transferred on the bus line. The terminator apparatus is comprised of a termination network, a current switching device, and a programmed monitoring circuit. The terminator apparatus serves to prevent erroneous data from being transferred by raising the voltage level of the notch above the critical "double trigger" area.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A signal line increased current kicker terminator apparatus used with a bus line for controlling voltage level of a notch occurring in data and control signals transferred on the bus line, comprising:

termination network means interconnected between an input termination power supply voltage and a plurality of data and control signal lines coupled to the bus line for generating a first current;

switching means interconnected between said power supply voltage and at least one of said plurality of data and control signal lines for generating a second current;

monitoring circuit means interconnected between said current switching device and said at least one of said plurality of data and control signal lines for controlling a programmed length of time that said second current is generated; and said switching means being responsive to said monitoring circuit means for disconnecting said second current when said programmed length of time has been exceeded, whereby said second current serves to raise the voltage level of the notch occurring in said at least one of said plurality of data and control signal lines when it is disasserted so as to prevent erroneous data from being transferred.

2. The terminator apparatus as claimed in claim 1, wherein said termination network means comprises a 220/330 terminator.

3. The terminator apparatus as claimed in claim 1, wherein said termination network means comprises a 110 regulated terminator.

4. The terminator apparatus as claimed in claim 1, wherein said switching means comprises a bipolar transistor of the PNP-type conductivity having its emitter connected to said power supply voltage and its collector coupled to said at least one of said plurality of data and control signal lines via a current-limiting resistor.

5. The terminator apparatus as claimed in claim 4, wherein said monitoring circuit means comprises first and second resistors, a bipolar transistor of the NPN-type conductivity, and a capacitor.

6. The terminator apparatus as claimed in claim 5, wherein said NPN-type bipolar transistor has its base coupled to said at least one of said plurality of data and control signal lines via said first resistor, its collector connected to the base of said PNP-type bipolar transistor via said second resistor, and its emitter connected to a ground potential, said capacitor having its one end connected to the collector of said NPN-type bipolar transistor and its other end connected to the ground potential.

7. The terminator apparatus as claimed in claim 6, wherein said programmed length of time is determined by the value of said second resistor and said capacitor.

8. The terminator apparatus as claimed in claim 4, wherein the amount of second current is determined by said current-limiting resistor.

9. The terminator apparatus as claimed in claim 8, wherein the voltage level of the notch is raised above a double triggering area.

10. The terminator apparatus as claimed in claim 1, wherein said at least one of said plurality of data and control signal lines is associated with a request control signal.

11. A signal line increased current kicker terminator apparatus connected to each end of a bus line for controlling voltage level of a notch occurring in data and control signals transferred on the bus line, each of the terminator apparatus comprising:
- termination network means interconnected between an input termination power supply voltage and a plurality of data and control signal lines coupled to the bus line for generating a first current;
- switching means interconnected between said power supply voltage and at least one of said plurality of data and control signal lines for generating a second current;
- monitoring circuit means interconnected between said current switching device and said at least one of said plurality of data and control signal lines for controlling a programmed length of time that said second current is generated; and
- said switching means being responsive to said monitoring circuit means for disconnecting said second current when said programmed length of time has been exceeded,
- whereby said second current serves to raise the voltage level of the notch occurring in said at least one of said plurality of data and control signal lines when it is deasseted so as to prevent erroneous data from being transferred.

12. The terminator apparatus as claimed in claim 11, wherein said termination network means comprises a 110 regulated terminator.

13. The terminator apparatus as claimed in claim 11, wherein said switching means comprises a bipolar transistor of the PNP-type conductivity having its emitter connected to said power supply voltage, its collector coupled to said at least one of said plurality of data and control signal lines via a current-limiting resistor.

14. The terminator apparatus as claimed in claim 13, wherein said monitoring circuit means comprises first and second resistors, a bipolar transistor of the NPN-type conductivity, and a capacitor.

15. The terminator apparatus as claimed in claim 14, wherein said NPN-type bipolar transistor has its base coupled to said at least one of said plurality of data and control signal lines via said first resistor, its collector connected to the base of said PNP-type bipolar transistor via said second resistor, and its emitter connected to a ground potential, said capacitor having its one end connected to the collector of said NPN-type bipolar transistor and its other end connected to the ground potential.

16. The terminator apparatus as claimed in claim 15, wherein said programmed length of time is determined by the value of said second resistor and said capacitor.

17. The terminator apparatus as claimed in claim 13, wherein the amount of second current is determined by said current-limiting resistor.

18. The terminator apparatus as claimed in claim 17, wherein the voltage level of the notch is raised above a double triggering area.

19. The terminator apparatus as claimed in claim 11, wherein said at least one of said plurality of data and control signal lines is associated with a request control signal.

20. A terminator method used with a bus line for controlling voltage level of a notch occurring in data and control signals transferred on the bus line, comprising the steps of:
- generating a first current from a termination network connected to an input termination power supply to at least one signal line;
- connecting a second current to said at least one signal line so as to raise the voltage level of the notch occurring therein;
- controlling a programmed length of time that the second current is connected to said at least one signal line, said programmed length of time controlled by a monitoring circuit means interconnected between a current switching device and at least one of a plurality of data and control signal lines; and
- disconnecting the second current when the programmed length of time has been exceeded.

* * * * *